United States Patent Office 3,600,360
Patented Aug. 17, 1971

3,600,360
METHOD OF MANUFACTURING POLYAMIDES BY ALKALINE POLYMERIZATION OF LACTAMS HAVING AN AT LEAST 7-MEMBERED RING
Zbyněk Bukač, Jiří Tomka, and Jan Šebenda, Prague, Czechoslovakia, assignors to Ceskoslovenska Akademie Ved, Prague, Czechoslovakia
No Drawing. Filed July 12, 1968, Ser. No. 744,338
Claims priority, application Czechoslovakia, July 18, 1967, 5,276/67, 5,277/67
Int. Cl. C08g 20/18
U.S. Cl. 260—78L
6 Claims

ABSTRACT OF THE DISCLOSURE

The method consists in carrying out the known alkaline polymerization of lactams, having an at least seven-membered ring, in the presence of a compound of the general formula

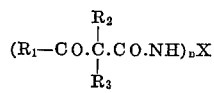

wherein X is the rest of the used amine with $n$ amino groups, $R_1$, $R_2$ and $R_3$ are alkyl, cycloalkyl, aryl or aralkyl groups with 1 to 18 carbon atoms, either separated or forming together a ring, $n$ is an integer, and either $R_2$ or $R_3$ can be also a hydrogen atom, if $n$ is greater than 1.

The rest X can be either plain or substituted hydrocarbon radical such as alkylene, arylene, dialkyl ether, dialkyl thioether, diaryl thioether, diarylsulfone, dialkyl amine, diaryl amine, polyvinyl- or polystyryl rest derived from the corresponding amine with $n$ amino groups. Any substituent on the rest X, which does not interfere with activated alkaline polymerization of lactams can be used, that is any chemically inert, non-acidic substituent such as alkyl, alkoxyl and the like.

GENERAL DISCLOSURE

Alkaline polymerization of lactams, e.g. of 6-caprolactam, is initiated by strong bases which are capable of forming the respective salt with the lactam. For instance, alkali metals or their hydrides form alkali metal salts with 6-caprolactam, inducing rapid polymerization of the caprolactam at 250° C. The catalytic efficiency of the lactam salts decreases, however, rapidly with decreasing temperature under 200° C. so that e.g. in presence of 0.5% mol. of the sodium salt of 6-caprolactam the conversion amounts to only about 10% during 10 minutes. Some organic compounds such as N-acylcaprolactams, anhydrides or chlorides of carboxylic acids considerably accelerate the polymerization (see e.g. the Czechoslovak Pat. No. 93,016) so that if runs rapidly even at temperatures of about 100° C. At higher temperatures the catalytic efficiency rapidly decreases with time. This disadvantage of the two-components catalysts can be removed by using an one-component catalyst according to Belgian Pat. No. 689,284 or Czechoslovak patent application No. 6970/66 from Nov. 3, 1966. The one-component catalysts consist of alkali metal salts of beta-keto-amides. The only disadvantage of such one-component catalysts is their lower rate of polymerization in comparison with the above mentioned two-component catalysts. According to the present invention, many advantages are gained by carrying out the alkaline polymerization of lactams in the presence of a compound of the general formula stated above. The rate of polymerization is increased in some cases by several orders in comparison with said one component catalysts, making possible a continuous polymerization combined with shaping (extruding, spinning, casting etc.). Such very rapid polymerization is achieved particularly with compounds of the above stated general formula, where none of the substituents $R_2$, $R_3$ is hydrogen. On the other hand, if said substituents are partly replaced by hydrogen, the polymerization can be more easily controlled and the mixtures of anhydrous lactam, an alkali metal catalyst and the activator according to the present invention are very stable at ambient temperatures so that they can be stored and distributed in moisture-proof packages. Such activated lactam in the form of blocks or pellets can be polymerized in a suitable mold by mere heating. Regarding the stability of the catalytic system, the polymerization can be advantageously carried out at temperatures under the melting point of the polyamide thus formed. The mixture can be melted (at about 70–75° C. in the case of 6-caprolactam) and the melt poured into the mold, preferably under reduced pressure in order to avoid gas bubbles.

If $n$ in the general formula is greater than 1, any of the substituents $R_2$, $R_3$ can be replaced by hydrogen either in one or in more groups from the amount $n$. Thus, the substitution is not necessarily symmetric.

In comparison with the known two-component catalysts, comprising e.g. sodium salt of 6-caprolactam and acetyl caprolactam, the efficiency of the catalytic system according to the invention is maintained for a considerably longer time so that the equilibrium polymer/monomer can be reached. It is thus possible to polymerize e.g. 6-caprolactam at 210° C. for a very short time, whereby a moldable polyamide with about 10% of extractibles is obtained. Then the polyamide is molded or extruded and the temperature is decreased to about 170–180° C. The solid polyamide is kept at this temperature until the content of the polymer rises to 97–98%. When using, however the above mentioned known two-component catalytic system, the temperature and time range within which the catalyst is active is very narrow and it is difficult, particularly in a large scale manufacture, to control the two-step polymerization with sufficient accuracy.

If a very high molecular weight is to be obtained, it is advantageous to choose such activators of the above said general formula, in which $n$ is at least 2.

At ambient temperature the polymerization rate is so low that lactams can be mixed with an alkali metal salt of the lactam and with the present activator and in some cases kept for a very long time without any change, provided that the access of moisture and acid gases is prevented. If, however, such mixture is heated to 160–220° C., the polymerization is rapid and the equilibrium corresponding to the polymerization temperature is reached very soon. Thus, a homogeneous mixture of a polymerizable lactam having at least 7 atoms in its ring with the above said catalytic system forms a new and useful material capable of being rapidly polymerized to a high grade polyamide with a low content of extractibles merely upon heating. Since the polymerization runs at a fairly high rate at temperatures below the melting point of the polyamide, the new material can be advantageously used for manufacturing large molded articles which are free of cavities. The manufacturer of such molded articles is no more bound to prepare catalysts and their mixtures with activators which are very sensitive to atmospheric humidity and other unfavorable factors of the ambient atmosphere: Instead he can use a handy finished mixture in the form of a solid solution of the catalyst and activator in molten lactam, said mixture having a sufficiently long shelf-life. The mixture can be pelleted or molded and evacuated prior to the solidification. The moldings or pellets are kept in moisture-proof package, in barrels or similar. In the case of large moldings an evacuation prior to the polymerization is also advisable.

EXAMPLE 1

0.3 molar percent of 6-caprolactam sodium salt was dissolved at 80° C. in 6-caprolactam and 0.3 molar percent of the 2-ethyl-2-phenyl carbamoyl cyclopentanone of the following structural formula was added:

I
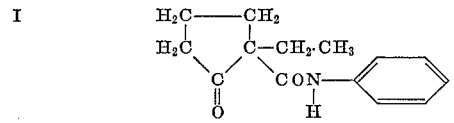

The mixture was kept at 175° C., whereat it solidified during 12 minutes.

If the polymerization was repeated with similar compounds having a hydrogen atom instead of the 2-ethyl group, in the form of its sodium salt and without lactam sodium salt, the mixture solidified only after 4 hours at equal conditions.

EXAMPLE 2

0.3 molar percent of 2-ethyl-2-benzyl-3-oxohexane ethylamide of the formula

II
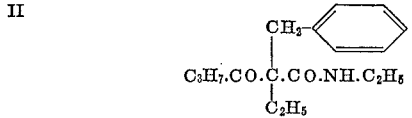

was dissolved in melted 6-caprolactam containing 0.3 molar percent of its sodium salt. The mixture was polymerized by heating under dry nitrogen under adiabatic conditions at the starting temperature of 150° C. The half-time of polymerization was 4 minutes. In contradistinction therewith, a known mixture of caprolactam with 0.3 molar percent of sodium caprolactam salt and 0.3 molar percent of acetylcaprolactam had, under equal conditions, the half-time of polymerization 8 minutes. The one-component catalyst consisting of 0.3 molar percent of sodium salt of the 2-ethyl-3-oxohexane ethylamide the latter having the formula III $\quad$ C$_3$H$_7$.CO.CH.CO.NH.C$_2$H$_5$
$\quad\quad\quad\quad\quad\quad\quad$ |
$\quad\quad\quad\quad\quad\quad\quad$ C$_2$H$_5$ polymerized caprolactam under equal conditions at a rate of 22 minutes (half-time).

The mixture according to this example was considerably more stable at ambient temperature than the mixture activated with acetylcaprolactam, although the latter showed a definitely lower polymerization rate than the compound II.

EXAMPLE 3

0.3 molar percent of caprolactam sodium salt and 0.3 molar percent of the 2-ethyl-2-benzyl-3-oxohexane anilide of the formula IV
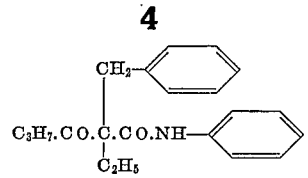

were subsequently dissolved in melted 6-caprolactam. The mixture was maintained at 175° C. for 60 minutes. The polymerizate contained 96.8 weight percent of polyamide 6.

EXAMPLE 4

A mixture of 6-caprolactam with 0.4 molar percent of its sodium salt and 0.4 molar percent of p-benzyloxyanilide of 2-ethyl-2-benzyl-3-oxohexanoic acid of the formula V
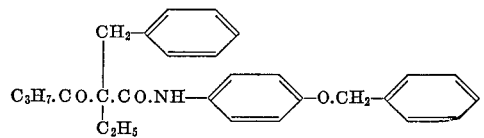

was heated for 10 minutes at 210° C. and after-polymerized in solid state at 175° C. for 50 minutes. The polymerizate contained the equilibrium content of the polyamide 6, i.e. 97 percent by weight.

EXAMPLE 5

0.003 mol of sodium salt of 7-enantholactam and 0.0015 mol of p-phenylene diamide of the 2-ethyl-2-benzyl-3-oxohexanoic acid of the formula VI
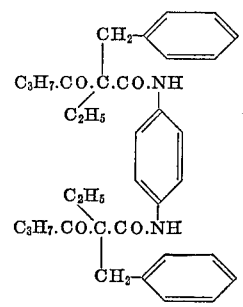

was dissolved in 1 mol of 7-enantholactam and polymerized under adiabatic conditions at starting temperature of 150° C. The polymerizate contained 96% of polyamide 7 with an average polymerization degree of 900.

EXAMPLE 6

0.005 mol of sodium salt of 6-caprolactam was added to 0.7 mol 6-caprolactam and 0.3 mol of a mixture of isomeric C-methylcaprolactams. 0.005 mol of 4-methoxyanilide of the 2-propyl-2-ethyl-3-oxoheptanoic acid of the formula VII
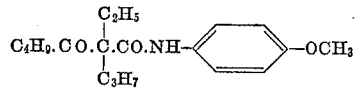

was then added as activator. The mixture was kept at 190° C. for 40 minutes. The polymerizate contained 84% (by weight) of copolyamide, this percentage nearing to the equilibrium value for the used mixture of monomers.

EXAMPLE 7

To 1 mol of anhydrous 6-caprolactam was added 0.0015 mol of the sodium salt of the p-phenylendiamide of the 2-ethyl-3-oxoheptanoic acid of the formula

VIII

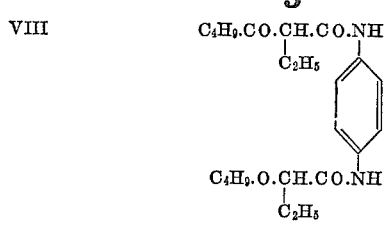

which dissolved at 80–90° C. The solution was solidified by cooling down under vacuum and kept in a sealed moisture-proof container. After 30 days storage at ambient temperature the mixture was without apparent change and could be polymerized by heating to 175° C. for 60 minutes. The polymerizate contained 97.7% of polyamide 6 with an average polymerization degree of 800. The molding was crystalline and free of cavities and bubbles.

EXAMPLE 8

0.002 mol of sodium salt of the benzidide of the 2-ethyl-3-oxo-heptanoic acid of the formula

IX

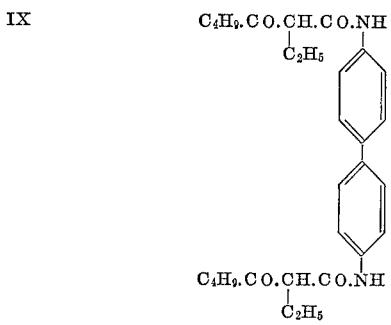

was dissolved in 1 mol of 6-caprolactam and the mixture was polymerized under inert dry gas for 60 minutes at 175° C. The yield of the polymer was 96.8% of polyamide 6 with an average polymerization degree of 600.

EXAMPLE 9

0.003 mol of sodium salt of the di-4,4'-(2-ethyl-3-oxohexane carbamido)-diphenylether of the formula

X

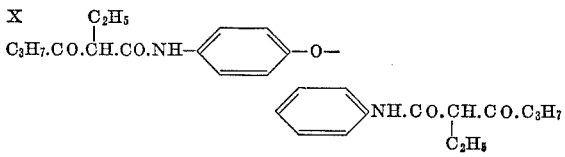

was dissolved in 1 mol of 7-enantholactam and the mixture was kept for 60 minutes at 175° C. The polymerizate thus obtained contained 97.8% of polyamide 7 with an average polymerization degree of about 400.

EXAMPLE 10

0.002 mol of sodium salt of the p-phenylene diamide of the 2-propyl-3-oxoheptanoic acid of the formula

XI

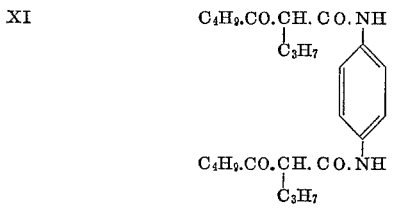

was dissolved in a mixture containing 0.3 mol of C-methyl-caprolactam isomers and 0.7 mol of 6-caprolactam. The mixture was homogenized and heated to 175° C. for 80 minutes. The polymerizate contained 89.8% of copolyamide—this percentage nearing to the equilibrium for the used mixture of monomers. The average polymerization degree was about 700.

EXAMPLE 11

0.3 mol of sodium salt of polystyrylamide of the 2-methyl-3-oxopentanoic acid of the formula

XII

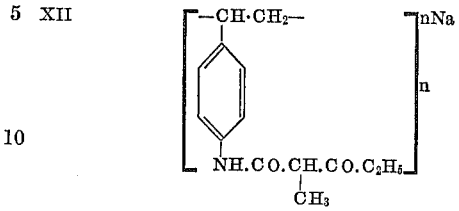

was dissolved in 6-caprolactam and kept for 60 minutes at 175° C. The yield of the partially crosslinked polymer reached the equilibrium value for the temperature of polymerization.

EXAMPLE 12

0.002 mol of sodium salt of the di-1,6-(2-hexadecyl-3-oxoeikosanoyl)hexamethylenediamine of the formula XIII    $C_{17}H_{35}.CO.CH.CO.NH(CH_2)_6.NH.CO.CH.CO.C_{17}H_{35}$
                    $|$                                $|$
                    $C_{16}H_{33}$                     $C_{16}H_{33}$ was heated for 60 minutes to 170° C. whereby the equilibrium conversion was reached. The polyamide had the polymerization degree of about 700.

EXAMPLE 13

Polymerization mixture contained 99.7 molar percent of 12-dodekanolactam, 0.2 mol percent of sodium salt of the 2-methyl-1,4-phenylenediamide of the 2-ethyl-acetoacetic acid of the formula

XIV

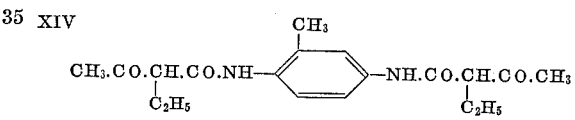

and 0.1 mol percent of the sodium salt of the p-phenylenediamide of the 2-propyl-3-oxoheptanoic acid of the formula

XV

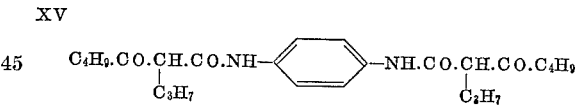

The mixture was heated to 185° C. for 60 minutes, whereby a polyamide having an average polymerization degree of about 500 was obtained.

EXAMPLE 14

A mixture prepared by dissolving 0.2% of sodium salt of the 2-benzyl-2-benzoyl butyranilide of the formula

XVI

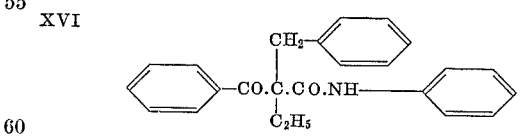

and 0.1% of sodium salt of the 2-methyl-2-cyclohexanoylbutyr-p-toluidide of the formula

XVII

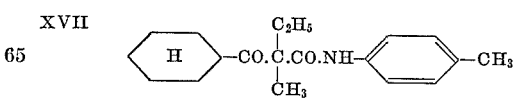

in 6-caprolactam was heated 30 minutes at 190° C. The polymerizate thus obtained contained the equilibrium amount of the polyamide 6.

EXAMPLE 15

0.003 molar percent of sodium salt of the p-(2-ethyl-3-oxohexaneamido)-anilide of the 2-benzyl-2-methyl-3-oxopentanoic acid of the formula

XVIII

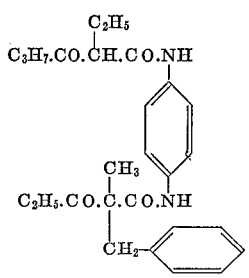

was dissolved in 1 mol of 6-caprolactam. The mixture was polymerized under dry nitrogen for 60 minutes at 175° C. The yield of the polyamide 6, having an average polymerization degree of about 600, was 96.8%.

From the foregoing examples it is clear that the alkali metal catalyst can be added in any form, i.e. not only in the form of the concerned lactam salt or a substance which forms said lactam salt, but also in the form of an alkali metal salt of the activator according to the invention. The activators have always some hydrogen atom which is acid enough to form a salt e.g. with sodium.

Whenever in the examples a percentage is mentioned, it is to be understood by weight.

Beta-ketoamides can be prepared by using known methods such as by aminolysis of beta-ketoesters, see e.g. Utzinger, Helv. Chim. Acta 35, 1359 (1952), or more conveniently by reacting diketenes with amines, compare e.g. U.S. patent specifications No. 1,982,675 and 2,152,132.

What we claim is:

1. The process of making high molecular weight polyamides by alkaline polymerization of lactams having a ring of at least 7 members in the presence of a catalyst of the formula:

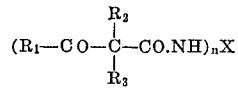

wherein $n$ is 1 or 2, $R_1$, $R_2$ and $R_3$ are the same or different and are alkyl of 1–18 carbon atoms, cycloalkyl of 5–6 carbon atoms, aralkyl or aryl and, if $n$ is 2, either $R_2$ or $R_3$ may also be hydrogen atom and wherein X is $R_1$, $R_2$ or $R_3$ if $n$ is 1 and, if $n$ is 2, is alkylene of 1–6 carbon atoms or arylene.

2. The process according to claim 1 wherein $R_1$ together with $R_2$ or $R_3$ forms a three-member ring of $CH_2$ groups.

3. The process of claim 1, wherein all of $R_1$, $R_2$ and $R_3$ are other than hydrogen.

4. The process of claim 1, wherein the said lactam is employed in the form of an alkaline metal salt thereof.

5. The process of claim 1, wherein the said catalyst is employed in the form of an alkaline metal salt thereof.

6. The process of claim 1, wherein the polymerization is effected at a temperature of 160–220° C. upon exclusion of moisture and acidic gases.

References Cited
UNITED STATES PATENTS 3,489,726   1/1970   Bukac et al. _____ 260—78

WILLIAM H. SHORT, Primary Examiner

L. M. PHYNES, Assistant Examiner